March 23, 1926.  
F. STEBLER  
FRUIT SORTING AND PACKING TABLE  
Filed April 14, 1925  2 Sheets-Sheet 2

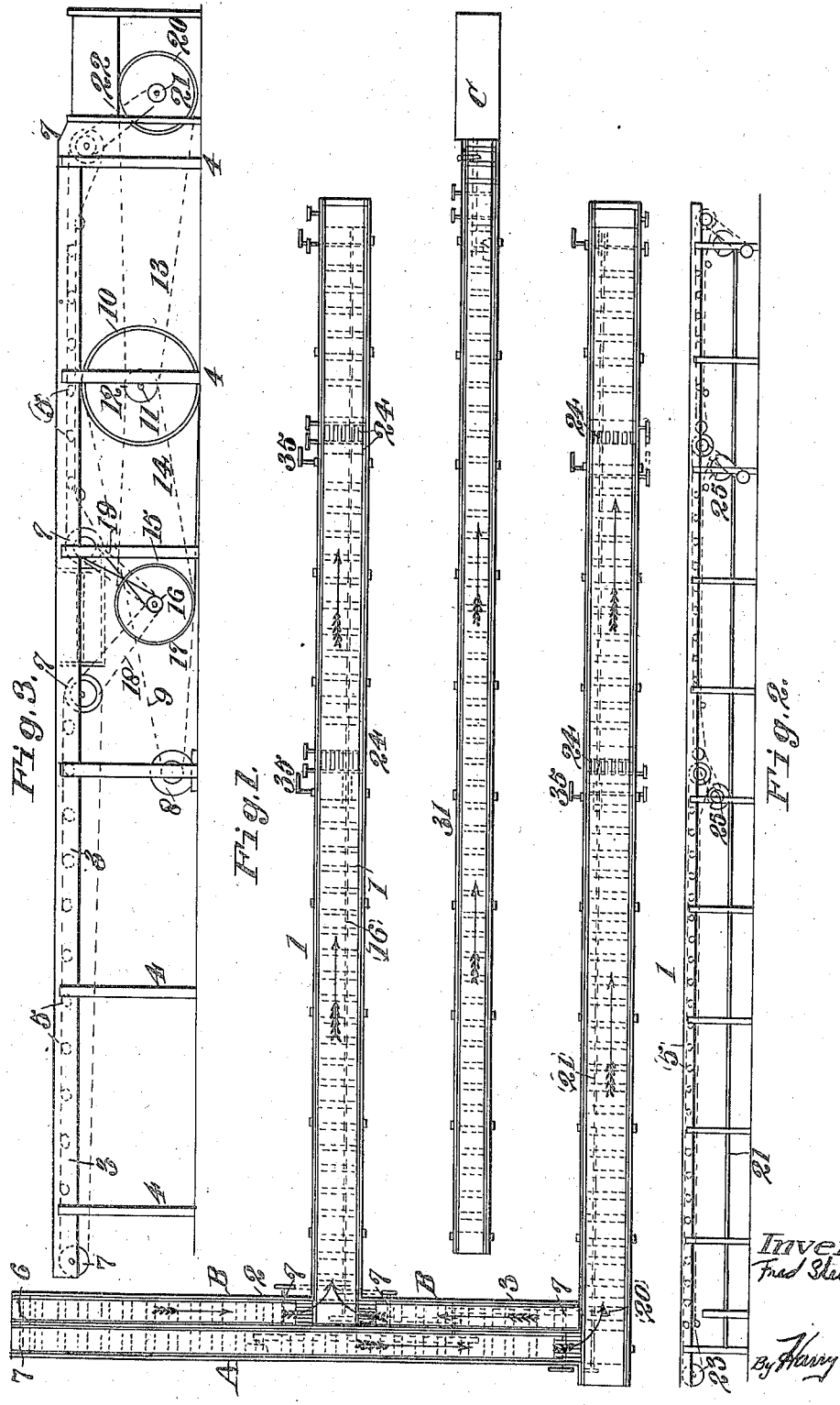

1,577,662

Inventor,
Fred Stebler.
By Harry H. Totter
Attorney.

Patented Mar. 23, 1926.

1,577,662

UNITED STATES PATENT OFFICE.

FRED STEBLER, OF RIVERSIDE, CALIFORNIA, ASSIGNOR TO STEBLER-PARKER CO OF RIVERSIDE, CALIFORNIA, A CORPORATION OF CALIFORNIA.

FRUIT SORTING AND PACKING TABLE.

Application filed April 14, 1925. Serial No. 22,990.

*To all whom it may concern:*

Be it known that I, FRED STEBLER, a citizen of the United States, residing at Riverside, in the county of Riverside and State of California, have invented certain new and useful Improvements in Fruit Sorting and Packing Tables, of which the following is a specification.

In the packing of lemons, it has been the practice to sort the fruit for size and shape by individual operators, this being necessary due to the fact that machine sizing is unsatisfactory, as the structure of the fruit is subject to bruising when handled by the types of sizing machines now on the market. In the handling of lemons, one crew of sorters utilizing a pair of boxes or trays hand sort the fruit for quality transferring it from one box to another. The sorted fruit is then transferred to the packers who likewise sort for size and shape from those same boxes or trays as they remove the fruit therefrom, wrap the same and pack it in the shipping boxes. This method of packing the fruit necessitates the packers selecting the fruit as to size and shape as they pick it from the box or tray necessitating more or less handling or pawing resulting often in the bruising of the fruit and requiring considerable time, making this operation quite expensive.

It is the object of the present invention to overcome the unnecessary handling of the fruit and to present the same in a slowly moving body to the operators and packers for their selection thereof, the sorters first working on the fruit to remove therefrom the unsalable fruit and from the remainder to select the first and second grade for packing, the packers then selecting from these first and second grades the fruit they desire to wrap and pack in the shipping box.

A further object of this invention is to make an arrangement or layout of mechanism for accomplishing the above object which will enable the efficient use from the greatest number of boxes within a limited area, thus not occupying an undue amount of floor space of a packing house, and to arrange the packing tables in such manner that the boxes when filled by the packers may be easily transferred to a packing box conveyer for handling the boxes from one or more packing tables.

A further object is to construct the packing tables of a plurality of endless belt sections arranged in end to end relation and one end of the table receiving the fruit from the sorting table, the belt sections of the packing table decreasing in length from the fruit receiving end of the table and being driven at successively reduced speeds from the receiving end of the table enabling the fruit as received from the sorting table to be available to a greater number of packers, and, after the first selection, to enable the remaining fruit to be available to a lesser number of packers, and so on until the fruit is exhausted on the packing table. It is also an object of the invention to provide individual clutch mechanisms whereby the operation of any selected belt section of the packing table may be disconnected from the driving mechanism.

With the above mentioned and other objects in view, the invention consists in the novel construction and combination of parts hereinafter described, illustrated in the accompanying drawings, and set forth in the claims hereto appended, it being understood that various changes in the form, proportion, size and minor details of construction within the scope of the claims may be resorted to without departing from the spirit or sacrificing any of the advantages of the invention.

In the drawings:—

Fig. 1 is a view in plan of the preferred embodiment of my invention.

Fig. 2 is a view in side elevation of one of the packing tables, and

Fig. 3 is a corresponding view of the sorting table.

Figure 4:
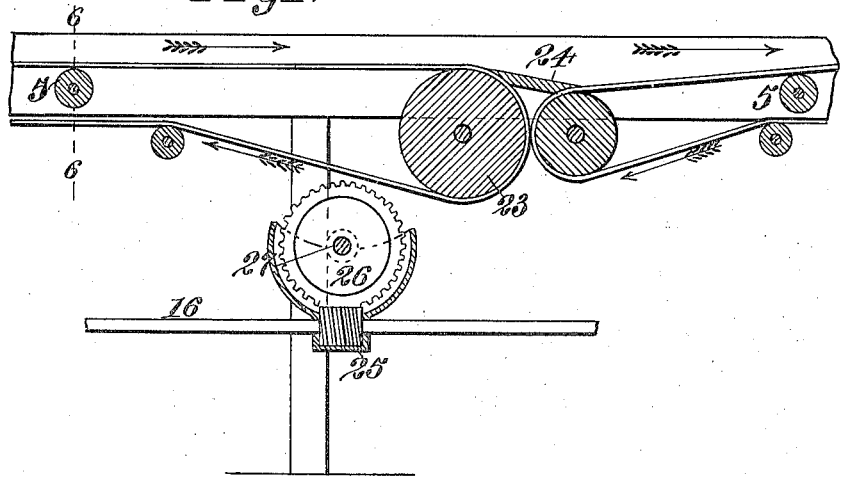
Fig. 4 is an enlarged detail longitudinal sectional view of the adjacent ends of a pair of belt sections on one portion of the packing table illustrating the work drive mechanism and the means for causing the turning of the fruit when passing from the discharge end of one belt on to the receiving end of the next belt.
Figure 5:
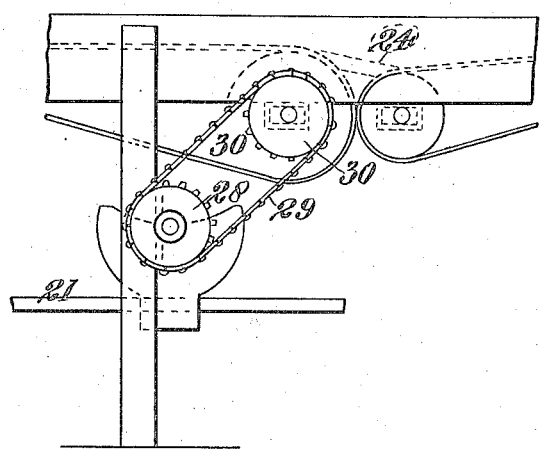
Fig. 5 is a view in side elevation of the structure illustrated in Fig. 4, showing more particularly the drive connection from the worm wheel to the belt drum.
Figure 6:
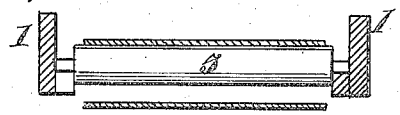
Fig. 6 is a sectional view on line 6—6 of Fig. 4 illustrating one of the belt supporting rollers.
Figure 7:
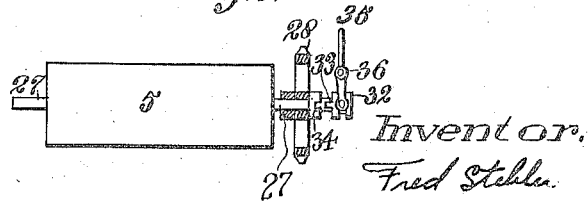
Fig. 7 is a view in detail of one form of packing belt cut out clutch.

Referring more particularly to the several views of the drawings wherein like characters of reference designate corresponding parts, and referring particularly to Fig. 1, the numerals 1 designate fruit packing tables arranged in parallel spaced relation with their corresponding ends extending in angular relation from a suitable sorting table 2. The sorting table 2 consists in the side frame members 3 supported by uprights 4, the side frame members being connected by belt supporting rollers 5 journaled at their ends therein, and in plan view the sorting table consists of a relatively long flight A and a pair of short flights B, the flights B being located immediately adjacent the flight A, and separated therefrom by a partition member 6. The respective flights A and the flights B each consist of an endless belt operating around their respective mounting rollers 7 at the respective ends of the flights, and said rollers are driven to cause the belts B to move from the ends of the frame 3 toward each other, and the belt A to move from one end of the frame 3 toward the other. This operating mechanism is illustrated particularly in Fig. 3, and consists of a motor 8 connected by a driving belt 9 with the periphery of the driving wheel 10, the supporting shaft 11 of which mounts a pair of belt shafts 12 around which extend the respective driven belts 13 and 14 extending in opposite directions from the shaft 11. The belt 14 operates over a sheave 15, which on its supporting shaft 16 has mounted a pair of belt sheaves 17. From these belt sheaves extend the respective belts 18 and 19, one operating each of the endless conveyers B to move the same toward each other in the direction of the arrows, Fig. 1. The power belt 13 operates over a pulley or sheave 20 carried by shaft 21, and the shaft in turn through a flexible driving connection 22 operates the sorting belt A in the direction of the arrow, Fig. 1. The shafts 16 and 21 extend the entire distance of the frames of the packing tables, as illustrated in Figs. 1 and 2 of the drawings, and said shafts afford the power means for moving the endless belt sections in the direction of the arrows, Fig. 1, which sections constitute the packing tables herein set forth. Each packing table consists of a plurality of endless flexible belt sections, illustrated as three in number, the ends of the belt sections operating over pulleys or drums 23 and supported within their length by transverse rollers 5. The belt sections forming the respective packing tables are successively shorter from the receiving end of the table as illustrated in Figs. 1 and 2, this being desirable in view of the fact that as the fruit remaining on the packing table and transferred from one section to the other is successively smaller in amount due to the packers standing along the inner side of the packing table having removed the more desirable fruit from the first section. Between the discharge end of one section and the receiving end of the other, there is positioned a fruit turning member 24 in the form of an inclined board down which the fruit is adapted to roll as discharged from the end of one section to another. Due to the belt sections forming the packing table adjacent the sorting tables receiving the entire quantity of fruit passing from the sorting tables, the packers adjacent thereto, in making their first selections from the entire quantity of fruit, are able to do so very quickly, but as the fruit is advanced and the more desirable sizes and shapes are removed, it necessitates slower work on the part of the packers located at the next succeeding belt section, therefore the succeeding belt sections are driven at a slower speed than those originally receiving the fruit from the sorting table. The driving of the belts forming the packing tables may be accomplished in any suitable manner, the form of mechanism illustrated consisting of a plurality of worms 25 on the respective shafts 16 and 21, and with each worm intermeshes a worm gear 26 mounting on its supporting shaft 27 a sprocket 28 connected by a chain 29 of the sprocket 30 associated with the shaft of one of the drums of the respective endless belt sections, it being understood that the gear ratio between the shaft and the drum of succeeding belt sections is lower than that of the preceding section, or reduced drive may be accomplished by reducing the diameter of the end supporting drums of the successive belt sections as in Figs. 4 and 5 of the drawings, and driving all drums with the same driving mechanism.

Between the packing tables 1, there is positioned a packing box conveyer 31 of any suitable construction adapted to receive filled boxes and convey the same to a station C where they are lidded and prepared for transportation.

This conveying mechanism being of a well known type, and in extensive use, and the lidding mechanism being in universal use in packing houses, a detailed description thereof is not thought to be necessary.

It will be observed that the belts forming the sorting tables B discharge onto one of the belt sections of one of the packing tables, while the belt forming the other sorting table discharges wholly on to the other packing table.

To enable the stopping of any desired belt section forming the packing tables 1, I provide a clutch mechanism between the respective shafts 27 and sprockets 28, and in its simplest form the same may consist of a collar 32 keyed to the shaft 27 for longitudinal movement thereon, the teeth 33 of which are adapted to be received in recesses 34 in the hub of the respective sprockets. The operation of the collar 32 in each instance is accomplished through the movement of a lever 35 pivoted as at 36. It is to be understood that this is but one form of clutch mechanism, and if desirable more complicated and more efficient forms of such mechanisms may be employed.

Packers equipped with fruit packing box supporting carriages assemble along the inside lines of the packing tables, pick the fruit therefrom, wrap it, and after so doing, pack it in the shipping boxes. After a box has been filled, the operator pushes its supporting carriage to the filled box conveyer belt and slides the box from the carriage onto the belt, the movement of which conveys it to the lidder. With an empty packing box on the carriage, the operator again takes a position along the inside edge of the packing table, at either one of the belt sections, and packs a succeeding box in the previous manner.

I claim:—

1. A fruit sorting and packing apparatus including a plurality of sorting tables, one serving as a fruit receiving member and the other adapted for receiving sorted fruit from the first member, a plurality of packing tables disposed angularly in the same direction from said sorting tables and one communicating with the discharge end of each of the sorting tables, each including endless belt conveying members, means for imparting movement to the sorting table forming belts, means for imparting movement to the packing table forming belts, and a filled box conveyer member disposed between said packing tables.

2. A fruit sorting and packing apparatus including a sorting table, a packing table disposed angularly thereto and with its receiving end communicating with the discharge end of the sorting table, each including endless belt conveyer members, a plurality of independent belt sections arranged in end to end relation with which said packing table communicates, means for operating the belt forming the sorting table to deliver fruit onto one end of the packing table, and means for operating the packing belt sections successively slower from its receiving toward its opposite end.

3. A fruit sorting and packing apparatus including a sorting table, a packing table disposed angularly thereto with its receiving end communicating with the discharge end of the sorting table, each of said tables including endless belt conveying members, said packing table consisting of a plurality of belt sections arranged in end to end relation, the belt sections as successively removed from the packing table being shorter, means for operating the belt forming the sorting table, and means for operating the packing table forming belt sections, the speed of the packing belt sections being successively slower from the discharge end of the sorting table belt.

4. A fruit sorting and packing apparatus including a plurality of parallel sorting tables arranged side by side, one serving as a fruit receiving member and the other for receiving sorted fruit from the first member, and each including an endless travelling belt, a plurality of packing tables extending angularly in the same direction from the sorting tables and disposed in parallel spaced relation, and each including a plurality of belt sections arranged in end to end relation for discharging one onto the other, means for driving the belts forming the sorting and packing tables, the packing belt sections as successively removed from the sorting table being shorter and operating at a slower speed, and a filled box conveyer positioned between the packing tables.

5. A fruit sorting and packing apparatus including a plurality of parallel sorting tables arranged side by side, one serving as a fruit receiving member and the other for receiving the sorted fruit from the first member, and each including an endless travelling conveyer, a plurality of packing tables extending angularly in the same direction from the sorting tables and disposed in parallel spaced relation, one of said packing tables adapted to receive fruit delivered from the respective sorting tables, and each including a plurality of belt sections arranged in end to end relation for discharging one onto the other, means for driving the belts forming the sorting tables to deliver the contents onto one end of each of said packing tables, means common to the sections of the respective packing belts for driving the same, and clutch controlled driving connections between the packing belt driving means and the respective sections.

6. A fruit packing apparatus comprising a packing table consisting of a plurality of endless belt sections arranged in alignment in end to end relation, said sections successively decreasing in length from one end of the table toward the other, and means for driving said belt sections in the same direction from the longer toward the shorter with the successively shorter sections operating at successively slower speeds.

In testimony whereof I have signed my name to this specification.

FRED STEBLER.